US012661791B2

(12) United States Patent
Beck et al.

(10) Patent No.: US 12,661,791 B2
(45) Date of Patent: Jun. 23, 2026

(54) ROBOT ARM SAFETY SYSTEM WITH RUNTIME ADAPTABLE SAFETY LIMITS

(71) Applicant: Universal Robots A/S, Odense S. (DK)

(72) Inventors: Anders Billesø Beck, Fredericia (DK);
David Brandt, Ferritslev Fyn (DK);
Jakob Schultz Ormhøj, Odense NV
(DK); Stefanos Nasiopoulos, Odense
SØ (DK)

(73) Assignee: Universal Robots A/S, Odense S. (DK)

( * ) Notice: Subject to any disclaimer, the term of this
patent is extended or adjusted under 35
U.S.C. 154(b) by 311 days.

(21) Appl. No.: 17/600,907

(22) PCT Filed: Apr. 1, 2020

(86) PCT No.: PCT/DK2020/050086
§ 371 (c)(1),
(2) Date: Oct. 1, 2021

(87) PCT Pub. No.: WO2020/200387
PCT Pub. Date: Oct. 8, 2020

(65) Prior Publication Data
US 2022/0184810 A1      Jun. 16, 2022

(30) Foreign Application Priority Data

Apr. 2, 2019    (DK) ............................ PA 2019 00407
Dec. 23, 2019   (DK) ............................ PA 2019 01543

(51) Int. Cl.
*B25J 9/16*          (2006.01)
*B25J 17/00*         (2006.01)
(52) U.S. Cl.
CPC ........... *B25J 9/1674* (2013.01); *B25J 9/1692*
(2013.01); *B25J 17/00* (2013.01); *G05B*
*2219/40202* (2013.01); *G05B 2219/49142*
(2013.01)

(58) Field of Classification Search
CPC ........ B25J 9/1674; B25J 9/1692; B25J 17/00;
G05B 2219/40202; G05B 2219/49142
See application file for complete search history.

(56) References Cited

U.S. PATENT DOCUMENTS 4,763,531 A     8/1988   Dietrich et al.
6,778,867 B1    8/2004   Ziegler et al.
(Continued)

FOREIGN PATENT DOCUMENTS

CN          1198375 A     11/1998
CN        101351753 A      1/2009
(Continued)

OTHER PUBLICATIONS

Universal Robots: User Manual UR3/CB3 (Year: 2009).*
(Continued)

*Primary Examiner* — David A Testardi
(74) *Attorney, Agent, or Firm* — ARENTFOX SCHIFF
LLP

(57) ABSTRACT

A robot system comprising a robot arm controlled by a
process controller according to a combination of basic
software and process software and a safety controller con-
figured to monitor and evaluate operation of a robot arm.
The basic software is associated with safety limits having
normal values limiting operation of the robot arm. The
process software is associated with at least one safety limit
having a process value which is different from the normal
value. The value of a safety limit is configured to be updated
with the process value while the robot system is in run-time
mode and the robot safety controller is configured to bring
the robot arm into a violation stop mode based on the result
of an evaluation of an operation parameter, the normal value
and the process value of the at least one safety limit.

34 Claims, 5 Drawing Sheets

(56) References Cited

U.S. PATENT DOCUMENTS

| | | | |
|---|---|---|---|
| 9,469,031 B2 | 10/2016 | Saito | |
| 10,065,316 B2 | 9/2018 | Sussman et al. | |
| 10,399,232 B2 | 9/2019 | Oestergaard et al. | |
| 10,413,371 B2 | 9/2019 | Sweeney, II et al. | |
| D895,704 S | 9/2020 | Johansen | |
| D895,705 S | 9/2020 | Johansen | |
| D895,706 S | 9/2020 | Johansen | |
| D898,090 S | 10/2020 | Johansen | |
| 10,850,393 B2 | 12/2020 | Oestergaard et al. | |
| D915,487 S | 4/2021 | Sell | |
| D924,228 S | 7/2021 | Mirth | |
| D932,485 S | 10/2021 | Mirth | |
| D932,486 S | 10/2021 | Mirth | |
| D932,487 S | 10/2021 | Mirth | |
| 11,260,543 B2 | 3/2022 | Johansen | |
| 11,474,510 B2 | 10/2022 | Oestergaard et al. | |
| 11,796,045 B2 | 10/2023 | Johansen | |
| 11,839,979 B2 | 12/2023 | Rosenlund et al. | |
| 11,964,389 B2 | 4/2024 | Johansen | |
| 12,011,824 B2 | 6/2024 | Vraa et al. | |
| 2007/0007262 A1* | 1/2007 | Aimi | B25J 9/1674 |
| | | | 219/130.5 |
| 2009/0091286 A1* | 4/2009 | Nihei | B25J 9/1666 |
| | | | 318/568.13 |
| 2009/0228120 A1* | 9/2009 | Fiebiger | B25J 9/1674 |
| | | | 901/50 |
| 2011/0264266 A1* | 10/2011 | Kock | B25J 9/1676 |
| | | | 700/255 |
| 2011/0282490 A1* | 11/2011 | Weigele | B25J 9/1674 |
| | | | 700/250 |
| 2013/0079928 A1 | 3/2013 | Soe-Knudsen et al. | |
| 2013/0231778 A1 | 9/2013 | Oestergaard et al. | |
| 2013/0255426 A1 | 10/2013 | Kassow et al. | |
| 2014/0195051 A1 | 7/2014 | Bonin et al. | |
| 2014/0214201 A1 | 7/2014 | Takemoto et al. | |
| 2015/0204742 A1 | 7/2015 | Draisey | |
| 2016/0016314 A1* | 1/2016 | Hietmann | B25J 9/1674 |
| | | | 901/9 |
| 2016/0129598 A1 | 5/2016 | Geiler et al. | |
| 2016/0346919 A1* | 12/2016 | Miyamoto | B25J 9/1674 |
| 2016/0379519 A1 | 12/2016 | Gupta et al. | |
| 2017/0028565 A1* | 2/2017 | Matsudaira | B25J 9/1674 |
| 2017/0100838 A1 | 4/2017 | Lewis | |
| 2017/0210017 A1* | 7/2017 | Yamamoto | B25J 9/1674 |
| 2017/0225331 A1* | 8/2017 | Sussman | B25J 9/1676 |
| 2017/0341233 A1 | 11/2017 | Keller et al. | |
| 2018/0178380 A1* | 6/2018 | Oestergaard | B25J 9/1656 |
| 2018/0222047 A1 | 8/2018 | Nishi | |
| 2018/0222052 A1 | 8/2018 | Vu et al. | |
| 2019/0030717 A1 | 1/2019 | Rublee et al. | |
| 2019/0105788 A1* | 4/2019 | Pilz | F16P 3/142 |
| 2019/0210228 A1* | 7/2019 | Kogan | B25J 13/02 |
| 2019/0381666 A1* | 12/2019 | Lo | B25J 9/1674 |
| 2020/0171658 A1 | 6/2020 | Kielsholm Thomsen | |
| 2020/0361087 A1* | 11/2020 | Ender | B25J 9/1664 |
| 2021/0086374 A1 | 3/2021 | Brandt et al. | |
| 2021/0116923 A1* | 4/2021 | Swann | B25J 5/007 |
| 2022/0161433 A1* | 5/2022 | Beck | B25J 9/1674 |
| 2022/0184810 A1 | 6/2022 | Beck et al. | |
| 2022/0226993 A1 | 7/2022 | Madsen | |
| 2022/0226995 A1 | 7/2022 | Beck et al. | |
| 2022/0379463 A1 | 12/2022 | Hansen | |
| 2022/0379468 A1 | 12/2022 | Hansen | |
| 2022/0388156 A1 | 12/2022 | Hansen | |
| 2023/0035296 A1 | 2/2023 | Soe-Knudsen et al. | |
| 2023/0052996 A1 | 2/2023 | Thomsen et al. | |
| 2023/0191603 A1 | 6/2023 | Thomsen et al. | |
| 2023/0405819 A1 | 12/2023 | Kravchenko et al. | |
| 2023/0405822 A1 | 12/2023 | Kravchenko et al. | |
| 2023/0418258 A1 | 12/2023 | Mirth | |
| 2024/0351209 A1 | 10/2024 | Graabøk et al. | |
| 2024/0399581 A1* | 12/2024 | Beck | B25J 9/1674 |

FOREIGN PATENT DOCUMENTS

| | | | | | |
|---|---|---|---|---|---|
| CN | 102208888 A | | 10/2011 | | |
| CN | 102455684 A | | 5/2012 | | |
| CN | 103158148 A | * | 6/2013 | | |
| CN | 103492133 | | 1/2014 | | |
| CN | 103679837 A | | 3/2014 | | |
| CN | 104656561 A | | 5/2015 | | |
| CN | 103158148 B | | 9/2015 | | |
| CN | 106061688 | | 10/2016 | | |
| CN | 106175936 A | | 12/2016 | | |
| CN | 106584452 A | | 4/2017 | | |
| CN | 107110118 A | | 8/2017 | | |
| CN | 107351088 A | | 11/2017 | | |
| CN | 107414864 | | 12/2017 | | |
| CN | 107848109 | | 3/2018 | | |
| CN | 108464863 | | 8/2018 | | |
| CN | 108695824 A | | 10/2018 | | |
| CN | 108772838 | | 11/2018 | | |
| CN | 208673079 U | * | 3/2019 | ........... | B25J 9/1643 |
| CN | 107351088 B | | 2/2020 | | |
| CN | 108772838 B | | 4/2021 | | |
| DE | 102008043530 A1 | * | 5/2010 | .......... | G05B 19/414 |
| EP | 0927612 | | 7/1999 | | |
| EP | 2047955 A2 | | 4/2009 | | |
| EP | 2230054 A1 | | 9/2010 | | |
| EP | 2366504 A2 | | 9/2011 | | |
| EP | 3105015 | | 12/2016 | | |
| EP | 3369536 A1 | | 9/2018 | | |
| EP | 3385040 A1 | | 10/2018 | | |
| EP | 3197645 B1 | | 5/2021 | | |
| JP | 08-335108 A | | 12/1996 | | |
| JP | 3288250 B2 | | 6/2002 | | |
| JP | 6003942 B2 | | 10/2016 | | |
| JP | 2018529140 A | | 10/2018 | | |
| JP | 6752499 B2 | | 9/2020 | | |
| JP | 2015208789 A | | 10/2023 | | |
| KR | 10-2018-0129020 A | | 12/2018 | | |
| SE | 1500299 | | 7/2015 | | |
| WO | 2012143044 | | 10/2012 | | |
| WO | 2014/110682 A1 | | 7/2014 | | |
| WO | 2015120864 | | 8/2015 | | |
| WO | 2015/131904 A1 | | 9/2015 | | |
| WO | 2017005272 | | 1/2017 | | |
| WO | WO-2017220597 A1 | * | 12/2017 | ........... | B25J 9/1602 |
| WO | 2018/091064 A1 | | 5/2018 | | |
| WO | WO-2019115738 A1 | * | 6/2019 | ........... | B25J 9/1664 |
| WO | 2019/162109 A1 | | 8/2019 | | |
| WO | 2020/200387 A1 | | 10/2020 | | |

OTHER PUBLICATIONS

Universal Robots UR10/CB3 User Manual, Original instructions (en), UR10/CB3, Version 3.1, Copyright @ 2009-2015 by Universal Robots A/S, 179 pages, downloaded from: https://fab.cba.mit.edu/content/tools/universal_robot_arms/ur10 user_manual_en_global.pdf (Year: 2015).*

Universal Robots Service Manual, Robot: UR3 with CB3-controller, Servicemanual_UR3_en_rev3.1.2, Copyright @ 2015 by Universal Robots A/S, 116 pages, downloaded from: https://www.crossco.com/wp-content/uploads/2019/07/Universal-Robots-3-Service-Manual.pdf (Year: 2015).*

Universal Robots PolyScope Manual Version 3.2 (rev.21833), Original instructions (en), Copyright @ 2009-2016 by Universal Robots A/S, 121 pages, downloaded from: https://www.usna.edu/Users/weaprcon/kutzer/_files/documents/Software Manual, UR.pdf (Year: 2016).*

Universal Robots UR10/CB3 User Manual, Original instructions (en), UR10/CB3, Euromap67, Version 3.4.5, Copyright @ 2009-2017 by Universal Robots A/S. Modified Oct. 2, 2017. 223 pages, downloaded from: https://s3-eu-west-1.amazonaws.com/ ur-support-site/27484/UR10_User_Manual_en_E67ON_Global-3.4.5.pdf (Year: 2017).*

Universal Robots UR3/CB3 User Manual, Original instructions (en), UR3/CB3, Euromap67, Version 3.5.5, Copyright @ 2009-2018 by Universal Robots A/S, 228 pages, downloaded from:

(56) References Cited

OTHER PUBLICATIONS https://s3-eu-west-1.amazonaws.com/ur-support-site/32341/UR3 User_Manual_en_E67ON_Global-3.5.5.pdf (Year: 2018).*
EPO machine translation of CN 208673079 U (original CN document published Mar. 29, 2019) (Year: 2019).*
International Search Report for International Patent Application No. PCT/DK2020/050086, mailed Jul. 20, 2020, 4 pages.
Written Opinion for International Patent Application No. PCT/DK2020/050086, mailed Jul. 20, 2020, 9 pages.
International Preliminary Report on Patentability for International Patent Application No. PCT/DK2020/050086, mailed Jul. 20, 2020, 10 pages.
Universal Robots: "User Manual UR3/CB3", Jan. 1, 2009, XP055712909, Retrieved from the Internet:URL:https://www.usna.edu/Users/weaprcon/kutzer/_files/documents/User%20Manual%20UR3.pdf [retrieved on Jul. 8, 2020].
Timo Malm et al: "Dynamic safety system for collaboration of operators and industrial robots", Central European Journal of Engineering, vol. 9, No. 1, Mar. 7, 2019 (Mar. 7, 2019), pp. 61-71, XP055712921, Heidelberg ISSN: 1896-1541, DOI: 10.1515/eng-2019-0011.
Olesya Ogorodnikova: "Human Robot Interaction: The Safety Challenge (An integrated frame work for human safety)", Jan. 10, 2010 (Jan. 10, 2010), pp. 1-114, XP055177445, Retrieved from the Internet: URL:http://www.omikk.bme.hu/collections/phd/Gepeszmernoki Kar/2010/Ogorodnikova -Oles ya/ertekezes.pdf [retrieved on Apr. 18, 2015].
First Office Action in Chinese Application No. 202080026205.0 dated Aug. 24, 2023 (with English summary), 16 pages.
Final Office Action in U.S. Appl. No. 17/600,677 dated Mar. 25, 2024, 11 pages.
Behnisch "White paper: safe collaboration with ABB robots, electronic position switch and SafeMove," Technical report, ABB, (2008), 45 pages.
Alegue, E. M. E. A., "Human-Robot Collaboration with High-Payload Robots in Industrial Settings," IECON 2018—44th Annual Conference of the IEEE Industrial Electronics Society, Washington, DC, USA, 2018, pp. 6035-6039, DOI: 10.1109/IECON.2018.8591069, 5 pages.
International Search Report and Written Opinion in Application No. PCT/DK2020/050085 dated Jul. 20, 2020, 12 pages.

International Preliminary Report on Patentability in Application No. PCT/DK2020/050085 dated Sep. 28, 2021, 9 pages.
First Office Action in Chinese Application No. 202080024155.2 dated Aug. 14, 2023, 21 pages (w/English summary).
Non-Final Office Action in U.S. Appl. No. 17/600,677 dated Oct. 26, 2023, 10 pages.
Communication pursuant to Article 94(3) EPC in Application No. 20724412.0 dated Feb. 15, 2024, 9 pages.
Notice of Reasons for Rejection in Japanese Application No. 2021-557739 dated Jan. 9, 2024, with English summary, 6 pages.
Communication pursuant to Article 94(3) EPC in Application No. 20724413.8 dated Feb. 15, 2024, 11 pages.
File History received for European Patent Application No. 20724412.0, mailed on Dec. 20, 2024, 176 pages.
File History received for European Patent Application No. 20724413.8, mailed on Dec. 20, 2024, 225 pages.
JP Decision of Rejection mailed May 21, 2024, for Application No. JP2021-557739. With English language summary. 7 pages.
Search Report and search opinion received for Danish Application No. PA 201901542, mailed on Jun. 23, 2020, 8 pages.
Search Report and Search Opinion received for Danish Application No. PA 201901543, mailed on Jun. 23, 2020, 8 pages.
Decision to Grant received for Japanese Patent Application No. 2021-557739, mailed on Dec. 3, 2024, 5 pages (2 pages of English Translation and 3 pages of Original Document).
Notice of Allowance received for Chinese Patent Application No. 202080024155.2, mailed on Mar. 27, 2024, 3 pages (2 pages of English Translation and 1 pages of Original Document).
Office Action received for Korean Patent Application No. 10-2021-7035173, mailed on Apr. 7, 2025, 11 pages (3 pages of English Translation and 8 pages of Original Document).
Search Opinion & Search Report received for Danish Patent Application No. PA 201900407, mailed on Jul. 19, 2019, 9 pages.
Universal Robots: User Manual UR3/CB3 (Jan. 1, 2009), Version 3.1 https://www.usna.edu/Users/weaprcon/kutzer/_files/documents/User%20Manual, %20UR3.pdf (181 pages). Copyright 2009-2015.
Notice of Reasons for Refusal (JP Patent Application 2021-557740); Examiner of Japan Patent Office; Dec. 26, 2023 (3 Pages).
Written Opinion for JP Patent Application 2021-557740; Examiner of Japan Patent Office; Jun. 18, 2024 (2pages).
Office Action for U.S. Appl. No. 18/807,626; Oct. 2, 2024; (13 pages).

* cited by examiner

ROBOT ARM SAFETY SYSTEM WITH RUNTIME ADAPTABLE SAFETY LIMITS

CROSS-REFERENCE TO RELATED APPLICATIONS

This application is a national stage entry of PCT Application No. PCT/DK2020/050086, which was filed on Apr. 1, 2020. PCT Application No. PCT/DK2020/050086 claims priority to Denmark Patent Application No. PA201900407 which was filed on Apr. 2, 2019 and to Denmark Patent Application No. PA2019001543 which was filed on Dec. 23, 2019. This application claims priority to PCT Application No. PCT/DK2020/050086, to Denmark Patent Application No. PA201900407, and to Denmark Patent Application No. PA2019001543. The contents of PCT/DK2020/050086, Denmark Patent Application No. PA201900407, and Denmark Patent Application No. PA2019001543 are incorporated herein by reference.

FIELD OF THE INVENTION

The present invention relates to a safety system for a robot arm where the safety system during operation of the robot arm is configured to monitor the robot arm and bring the robot arm into a safe state if the robot arm is brought into an unsafe mode of operation.

BACKGROUND OF THE INVENTION

Robot arms comprising a plurality of robot joints and robot links where actuators can rotate or translate part of the robot arm in relation to each other are known. The robot arm can comprise rotational joints where an actuator is configured to rotate a part of the robot arm, and/or prismatic joints where an actuator is configured to translate one part of the robot arm. Typically, the robot arm comprises a robot base which serves as a mounting base for the robot arm; and a robot tool flange where to various tools can be attached, and where a number of robot joints and robot links connect the robot base and the robot tool flange. A robot controller is configured to control the robot joints in order to move the robot tool flange in relation to the base. For instance, in order to instruct the robot arm to carry out a number of working instructions.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm, and may comprise information of the robot arm such as, length, size of the joints and links and can for instance be described by Denavit-Hartenberg parameters or like. The dynamic model makes it possible for the controller to determine which torques the joint motors shall provide in order to move the robot joints for instance at specified velocity, acceleration or in order to hold the robot arm in a static posture.

Typically, it is possible to attach various end effectors to the robot tool flange, such as grippers, vacuum grippers, magnetic grippers, screwing machines, welding equipment, dispensing systems, visual systems, force/torque sensors, which can be used together with the robot arm in order to perform various tasks. The robot arm need to be programmed by a user or a robot integrator which defines various instructions for the robot arm, such as predefined moving patterns and working instructions such as gripping, waiting, releasing, inspection, screwing instructions. A software extension to the robot control software may be provided in order to be able to program an end effector mounted to the robot arm and the end effector provider may provide such software extension together with the end effector. For instance, the robot arm maybe configured to carry out the method for extending end user programming of an industrial robot with third party contributions as disclosed in WO 2017/005272 incorporated herein by reference.

Additionally, the instruction can be based on various sensors or input signals which typically provide a triggering signal used to stop or start a given instruction. The triggering signals can be provided by various indicators, such as safety curtains, vision systems, position indicators, etc.

The use of robot arms along and near humans is increased and to increase the variety of work processes where robots can help humans an increased focus on safety, price and flexibility of the robots is demanded. The robot arms are thus provided with a safety system which monitors the operation the robot arm and is configured to bring the robot arm into a safe stop mode before hazardous situations where humans potentially can get hurt occurs. To increase safety, the robot safety controller and the robot process controller are provided on different hardware. The robot safety controller is configured to monitor various sensor signals related to the robot arm and to carry out a number of safety functions (for instance as described in WO 2015/131904 incorporated herein by reference) of the robot arm upon which the safety system brings the robot into a safe state if an unsafe state if registered. The known safety systems monitor the operation of the robot arm independently of eventual end effectors consequently the safety system cannot bring the robot arm into a safe state if for instance an end effector is in an unsafe state.

SUMMARY OF THE INVENTION

The object of the present invention is to address the above described limitations with the prior art or other problems of the prior art. This is achieved by a robot system, comprising:
- a robot arm comprising a plurality of robot joints connecting a robot base and a robot tool flange,
- a robot process controller configured to control operation of the robot arm according to a combination of basic control software and process control software,
- a robot safety controller configured to monitor and evaluate operation of the robot arm, wherein the basic control software is associated with a set of safety limits each having normal values limiting operation of the robot arm when controlled by the robot process controller according to the basic control software, wherein the process control software is associated with at least one safety limit of the set of safety limits having a process value which is different from the normal value, wherein the process value of at least one safety limit is configured to be changed while the robot system is in run-time mode, and wherein the robot safety controller is configured to bring the robot arm into a violation stop mode if an evaluation of one or more operation parameter made results in a violation of the more restrictive of the normal value and the process value of the at least one safety limit. This is advantageous in that it has the effect, that the safety limits can be changed and evaluated while the robot process and robot safety controllers are in run-time mode i.e. during operation of the robot arm. This is furthermore advantageously in that it has the effect, that the value of safety limits can be updated, without compromising the safety of the robot system in that it is always the more restrictive of the normal value and the process value which is limiting the operation of the robot arm. Therefore, additional certification or recertification of the robot system can be avoided. This is furthermore advantageous in that it has the effect, that users of the robot arm and/or providers of process control software are allowed to change the safety limits and thereby provide additional flexibility to the control and operation of the robot arm.

Robot process controller should be understood as the controller controlling the operation of the robot arm and can be implemented as any processing device for instance as a PLC (Programmable Logic Controller), a CPU (Central Processing Unit), a plurality of processing units, micro controllers etc.

Robot safety controller should be understood as a controller monitoring the operation of the robot arm and if the value of a defined monitored operation parameters exceeds a defined threshold values such as a safety limit, the robot safety controller brings the robot arm in the violation stop mode. The Robot safety controller can be implemented as any processing device for instance as a PLC (Programmable Logic Controller), a CPU (Central Processing Unit), a plurality of processing units, micro controllers etc.

Basic control software should be understood as software which is used by the process controller to control movement of the robot arm i.e. of the individual joints and thereby of the robot flange and any robot tool attached thereto. The basic control software is typically developed based on a mathematical model of the robot arm and is delivered together with the robot arm. So that the user of the robot arm can move the robot arm without any particular programming skills. It should be mentioned, that the basic control software defines default values for the different safety limits. The default values may also be referred to as normal values and can only be changed within a predefined range if the robot arm is powered off.

Process control software should be understood as software provided to the robot system from an external source such as a data processing unit, server, computer or tablet on which such process control software is stored or developed. Process control software can also be provided by direct programming of the robot system via a user interface. Process control software can be simple coordinates in a three-dimensional Cartesian coordinate system defining waypoints for movement of the robot arm, program code defining the operation of a robot tool attached to the robot flange, advanced math for determine points in the Cartesian coordinate system, optimize precision e.g. in movements, sensors systems, etc. Hence, the process controller controls the movement of the robot arm and tool based on a combination of process and basic control software, where the process control software provides process values to at least one safety limit defined by the basic control software.

The value of an operation parameters used in the basic and process control software reflects a position, movement, force, distance, time, limit of e.g. power or torque, direction, etc. related to the operation of the robot arm. Hence, e.g. the speed, acceleration, force, etc. measured or derived from measurements of e.g. a robot joint are examples of operation parameters.

Safety limits should be understood as limiting values of operation parameter. Examples of a safety limits could be the robot joint speed which could be a value in an operation window starting at 0 and ending at 400 degrees/s, typically a maximum value (safety limit) between 15-360 degrees/s for wrist joints of and 15-120 degrees for base/shoulder/elbow joints; tool flange speed, which could be a value in an operation window starting at 0 and ending at 5 m/s, typically a maximum value (safety limit) between 1-2 m/s; power consumption of the robot arm which could be a value in an operation window starting at 10 w and ending at 1000 w; stopping time which could be a value in an operation window starting at ¼ s and ending at 1 s; stopping distance which could be a value in an operation window starting at 1 cm and ending at 2 m. A real-time value of the operation parameter is established based on calculations or measurement e.g. direct measurement performed at the robot joints or derivable hereof.

A process value of a safety limit is provided to optimize a given process carried out by the robot arm. The process value would typically reduce the operation window of the robot arm compared to an operation window defined by normal values. Typically, this will make the robot arm move slower, more precise, produce less motor torque, etc.

The robot arm can by default be controlled according to the normal values of the safety limits. However, if the value of one or more safety limits is updated or change to a process value the more restrictive of these limits is used as control parameter. In fact, the process control software can specify a range within which the user while the robot arm is in run-time mode can adjust the process values. Being able to change the value of a safety limit runtime i.e. while the robot is in operation e.g. while it is moving, is advantageous in that it has the effect that implementation and running-in of the robot arm on site can be made faster compared to prior art robot systems only offering change of the safety limit values when the robot arm is powered off. Further, since the values can be changed without powering off (dynamic safety limit values adjustment) cycle time can be reduced and not least a source of irritation is removed due to the dynamic adjustment.

Violation stop mode should be understood as a safety stop arrangement applied automatically if an evaluation results in violation of one of the safety limits i.e. if the robot system automatically detects that something is not right in the robot system. Typically, the robot process controller predicts that there is a risk of violation of a safety limit, it would bring the robot arm in protective mode. If this has not happened within a stopping time, the safety controller will bring the robot arm in the violation stop mode. The violation stop mode caused by violation of safety limits, is similar to the emergency stop mode caused by manual activation of an emergency stop button. In both the violation stop mode and in the emergency stop mode, the mechanical brakes of the individual joint are activated, and the robot arm is powered off. Reset of both violation stop and emergency stop requires manual reset either at a physical emergency button or via the process and/or safety control software.

Evaluation should be understood as an evaluation of real time operation values against safety limits such as the values (normal and/or process) of the safety limits. The evaluation may be performed completely or partly by the robot safety controller or by the robot process controller. The evaluation may be a simple comparison between a safety limit and a real-time value of an associated operation parameter.

In an embodiment the robot system is configured to bring the robot arm in a protective stop mode if the robot process controller estimates that an operation parameter violates the more restrictive of the normal value and the process value of the at least one safety limit is violated. This is advantageous in that it has the effect, that in case of violation or expected violation of a safety limit the robot arm enters a soft stop mode that does not include power off and activation of mechanical brakes. Hence, reset and continuous operation of the robot arm can continue after simple reset or simple restart of the execution of the basic/process control software. It should be mentioned, that the estimation of violation of safety limits may be based on a prediction where the process controller based on current state (speed, direction, force, etc.) calculates future operation and if this is to violate any safety limits. Alternatively, it may be based on measurements or values derived from such that is then compared to the value of the safety limit. Finally, it should be mentioned, that the estimation/comparison in an exemplary embodiment is made to the value of a safety limit minus an offset.

The process controller is configured to bring the robot arm into the violation stop mode if the evaluation of one or more operation parameter made by the robot process controller results in a violation of the more restrictive of the normal value minus an offset and the process value minus an offset of the at least one safety limit. This is advantageous in that it has the effect, that both the robot safety and process controllers are able to bring the robot arm in to violation stop mode. The offset should be understood as a value subtracted from the nominal value of the safety limit. In this way the robot process controller and the robot safety controller have different values for the same safety limit and therefore no conflicts occur between the two controllers on which to activate a stop mode such as the violation stop first. The value of the offset scan be set as close to the nominal value of the safety limit as possible to ensure the full window of operation for the robot arm. With this said factors such as hysteresis of sensors, contactors, transistors and the like in practice defines the offset value. Accordingly, the offset value could be a predetermined percentage of the nominal value of the safety limit or it could be individually determined for one or more safety limits. It should be mentioned, that the robot process controller may also be used to bring the robot arm into violation stop mode if the evaluation results in a violation of the more restrictive of the normal and process values without first subtracting the offset.

In an embodiment of the robot system, the robot process controller is configured to compare the normal value of a safety limit with a process value of the same safety limit to establish the more restrictive of the two. This is advantageous in that it has the effect, that the value of the safety limit used during control of the robot arm is identified and thereby which limit of the safety limit that should be used to control the robot arm, for instance in order to bring the robot arm in violation stop mode.

In an embodiment of the robot system, the robot process controller is configured to control the robot arm in a reduced operation mode based on reduced normal value of one or more safety limits. This is advantageous in that it has the effect, that limits e.g. related to speed for moving the robot flange can be reduced in dependency of where the robot arm is positioned or where a person or fragile object is positioned with respect to the robot arm.

In an embodiment of the robot system, the value of a safety limit is updated with a process value, when process software is uploaded to a memory from which the robot process controller can execute basic control software and process control software. After the process control software is available to the safety and process controllers, the process value can be adjusted runtime without any software updates are needed and without powering off the robot arm.

In an embodiment of the robot system, the set of safety limits is stored on a safety memory. In this situation, the robot safety controller provides access to the set of safety limits for the robot process controller or provides the set of safety limits to the robot process controller.

In an embodiment of the robot system, the safety limits are selected from the list comprising: tool center point speed, tool center point force, elbow speed, elbow force, joint speed, joint position, stopping distance, stopping time, power limit, torque limit and tool direction.

In an embodiment of the robot system, the evaluation comprises establishing a value for the one or more operation parameters and compare the established value with the associated safety limit. The values for the operation parameters may be established by sensors providing input to the robot process/safety controller or the robot process/safety controller reading input from sensors. Alternative, a value of an operation parameter may be derived from measurements of two or more different operation parameters. The evaluation may include comparison of the result of calculation/measuring of operation values calculated or measured from two independent controllers/sensors performing redundant calculation or measurement. At least part of the evaluation may be performed e.g. by appropriate equipment located in the individual joints. An example hereof could be the redundant calculation/measurement in a joint performed by at least two processors and/or sensors.

In an embodiment of the robot system, the safety rating of the robot safety controller is higher than the safety rating of the robot process controller. This is advantageous in that it has the effect, that by using such safety rated controller, likelihood of hazardous situations is reduce in that the robot safety controller complies with requirements to the safety integrity level (SIL; Safety Integrity Level) 2 or level 3 and/or complying with requirements of the functional safety standard (IEC61508).

In an embodiment of the robot system, the robot safety controller is configured to provide a confirmation to the robot process controller, where the confirmation indicates that the robot safety controller has received the process values for the at least one safety limit.

In an embodiment of the robot system, the robot system comprises at least two independent robot safety controllers provided on different hardware, where each independent robot safety controller is configured to bring the robot arm into the violation stop mode if the evaluation of one or more operation parameter made by one of the at least two robot safety controllers result in a violation of the more restrictive of the normal value and the process value of the at least one safety limit. This is advantageous in that it has the effect, that safety relating to operating the robot arm is increased in that if one of the two robot safety controllers fails, the robot arm can continue operating based on the remaining robot safety controller. Also, the remaining robot safety controller can be configured to bring the robot arm into the violation stop mode if the other robot safety controller fails, this increases the safety level of the robot system.

In an embodiment of the robot system, the robot system comprises a user interface enabling a user to communicate with the robot system, wherein the user interface comprises user interface means for changing value of process values of one or more safety limits while the robot arm is in run-time mode. This is advantageous in that no additional hardware is needed to update or change the value of safety limits with process values. The user interface means may for instance be provided as a graphical user interface on a display where through a user can communicate with the robot system. For instance, the adjustment may be established by a sliding bar on a touch display.

Additionally, the object of the present invention can also be addressed by a method of monitoring a robot system comprising:

a robot arm comprising a plurality of robot joints connecting a robot base (105) and a robot tool flange, a robot process controller configured to operate the robot arm according to basic control software, wherein the operation of the robot arm according to the basic control software is limited by a normal value of a safety limit for each of a plurality of operation parameters, and a robot safety controller configured to monitor and evaluate operation of the robot arm, wherein the robot process controller and the robot safety controller is provided on different hardware, where the method comprises the steps of:

via a data processing unit, establish process control software and an associated process value for at least one of the plurality of safety limits, store the process control software including the at least one process value on a robot system memory, by the robot process controller control the operation of the robot arm based on a combination of the basic control software and the process control software, during operation of the robot arm, establish a real-time value of at least one operation parameter, and by the robot safety controller, bring the robot arm into a violation stop mode if an evaluation of the real-time value of the at least one operation parameter violates the more restrictive of the normal value and the process value of the safety limit of the at least one operation parameter.

The data processing unit should be understood as a software development tool or storage of such software for instance the robot controller itself or an external data processing unit. Hence, the process control software, whether it is a set of parameters or a program enabling integration and control of a robot tool (including a sensor) attached to the robot arm, is developed external to the robot controller and when uploaded to a robot system memory associated with the robot process controller or robot safety controller it is accessible by these controllers and can thereby be used at least partly to control the robot arm and tool hereof.

In an embodiment of the method, the real-time value of the at least one operation parameter is established by one or more joint controllers.

In an embodiment of the method, the evaluation is made by one or more joint controllers. This is advantageous in that it has the effect, that a faster system response to errors is obtained. Further the process and safety controllers does not need to use processor power on this evaluation. Instead a signal is simply provided from the joint controller to the process and/or safety controller. Alternatively, the evaluation is performed by the robot process controller or by the robot safety controller.

In an embodiment of the method, a signal indicating the result of the evaluation is provided to the process controller and/or to the safety controller, and based hereon, the process controller and/or the safety controller determines if a change of mode of operation of the robot arm is necessary.

In an embodiment of the method, the method further comprises the step of adjusting a process value while the robot system is in run-time mode.

In an embodiment of the method, the robot process controller brings the robot arm into the violation stop mode if the evaluation of one or more operation parameter made by the robot process controller results in a violation of the more restrictive of the normal value minus an offset and the process value minus an offset of the at least one safety limit. Alternatively, the robot process controller brings the robot arm in a protective stop mode.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
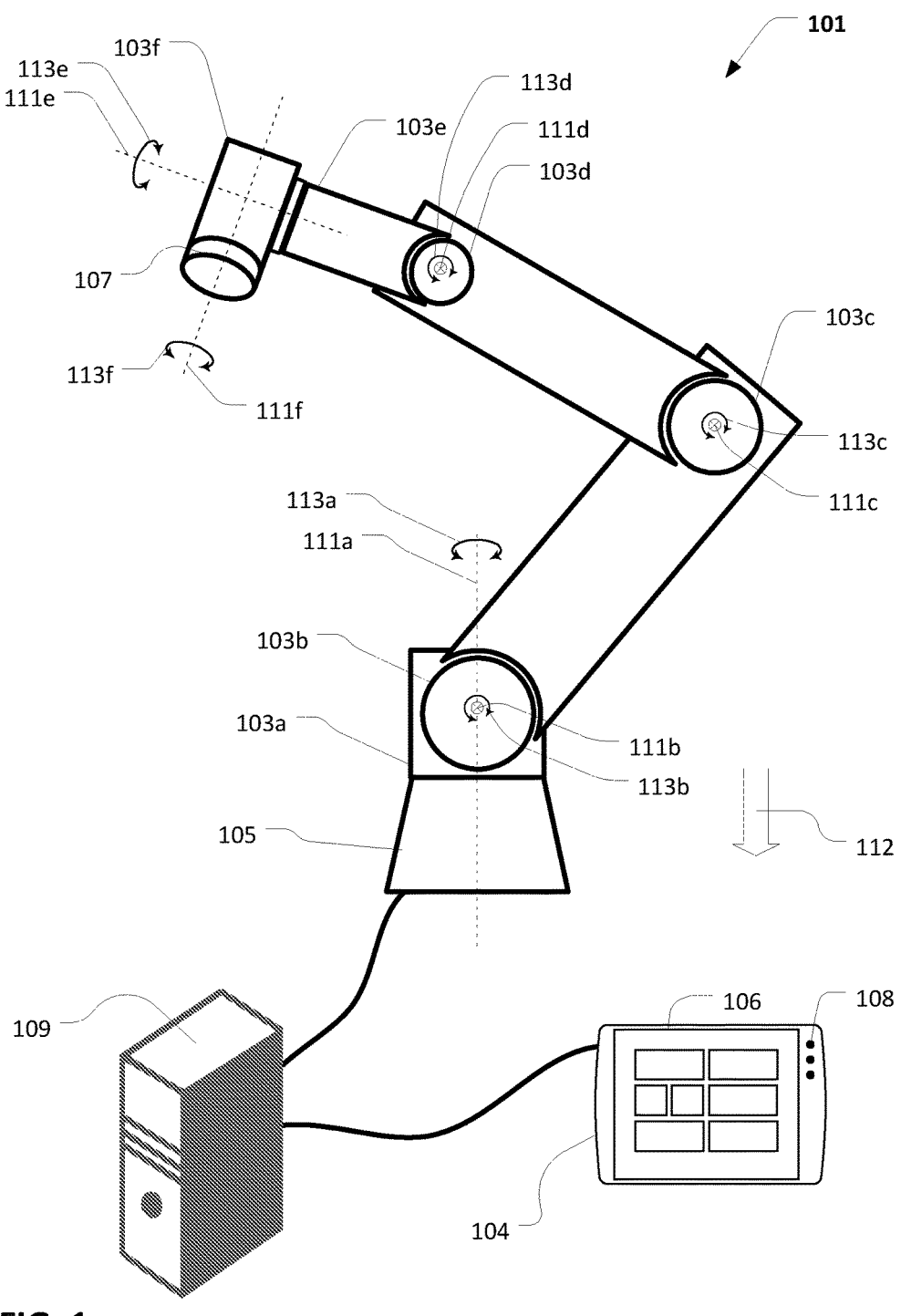
FIG. 1 illustrates a robot system according to the present invention.

FIG. 1 illustrates a robot arm 101 comprising a plurality of robot joints 103*a*, 103*b*, 103*c*, 103*d*, 103*e*, 103*f* connecting a robot base 105 and a robot tool flange 107. A base joint 103*a* is configured to rotate the robot arm around a base axis 111*a* (illustrated by a dashed dotted line) as illustrated by rotation arrow 113*a*; a shoulder joint 103*b* is configured to rotate the robot arm around a shoulder axis 111*b* (illustrated as a cross indicating the axis) as illustrated by rotation arrow 113*b*; an elbow joint 103*c* is configured to rotate the robot arm around an elbow axis 111*c* (illustrated as a cross indicating the axis) as illustrated by rotation arrow 113*c*, a first wrist joint 103*d* is configured to rotate the robot arm around a first wrist axis 111*d* (illustrated as a cross indicating the axis) as illustrated by rotation arrow 113*d* and a second wrist joint 103*e* is configured to rotate the robot arm around a second wrist axis 111*e* (illustrated by a dashed dotted line) as illustrated by rotation arrow 113*e*. Robot joint 103*f* is a tool joint comprising the robot tool flange 107, which is rotatable around a tool axis 111*f* (illustrated by a dashed dotted line) as illustrated by rotation arrow 113*f*. The illustrated robot arm is thus a six-axis robot arm with six degrees of freedom, however it is noticed that the present invention can be provided in robot arms comprising fewer or more robot joints, further it is to be understood that the robot joint also may comprise prismatic joints or a combination of both rotational joints and prismatic joints.

Each of the joints comprises an output flange rotatable in relation to the robot joint and the output flange is connected to a neighbor robot joint either directly or via an arm section as known in the art. The robot joint comprises a joint motor configured to rotate the output flange, for instance via a gearing or directly connected to the motor shaft. Additionally, the robot joint comprises at least one joint sensor providing a sensor signal indicative of at least one of the following parameters: an angular position of the output flange, an angular position of the motor shaft of the joint motor, a motor current of the joint motor or an external force trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor.

In an exemplary embodiment, one or more joints each comprise two sensors and two joint controllers. In this way, joint specific calculations and measurements can be established without impacting the robot controller thereby reducing risk of malfunctioning thereof, data communication between joint and robot controller and generally by performing decentral measuring and processing increase the system response time. Further, the redundancy in the joints reduces the risk of failure i.e. if one sensor or joint controller fails, there is an additional sensor or joint controller that can be used.

The robot arm comprises at least one robot controller arrange in a robot control box 109 and configured to control the robot joints by controlling the motor torque provided to the joint motors based on a dynamic model of the robot arm, the direction of gravity acting 112 and the joint sensor signal. The robot controller can be provided as a computer comprising in interface device 104 enabling a user to communicate with the robot, for instance to control and program the robot arm. The controller can be provided as an external device for instance arranged in a robot control box 109 as illustrated in FIG. 1, as a device integrated into the robot arm or as a combination thereof. The interface device can for instance be provided as a teach pendent as known from the field of industrial robots which can communicate with the robot controller via wired or wireless communication protocols. The interface device can for instanced comprise a display 106 and a number of input devices 108 such as buttons, sliders, touchpads, joysticks, track balls, gesture recognition devices, keyboards etc. The display may be provided as a touch screen acting both as display and input device.

Figure 2:
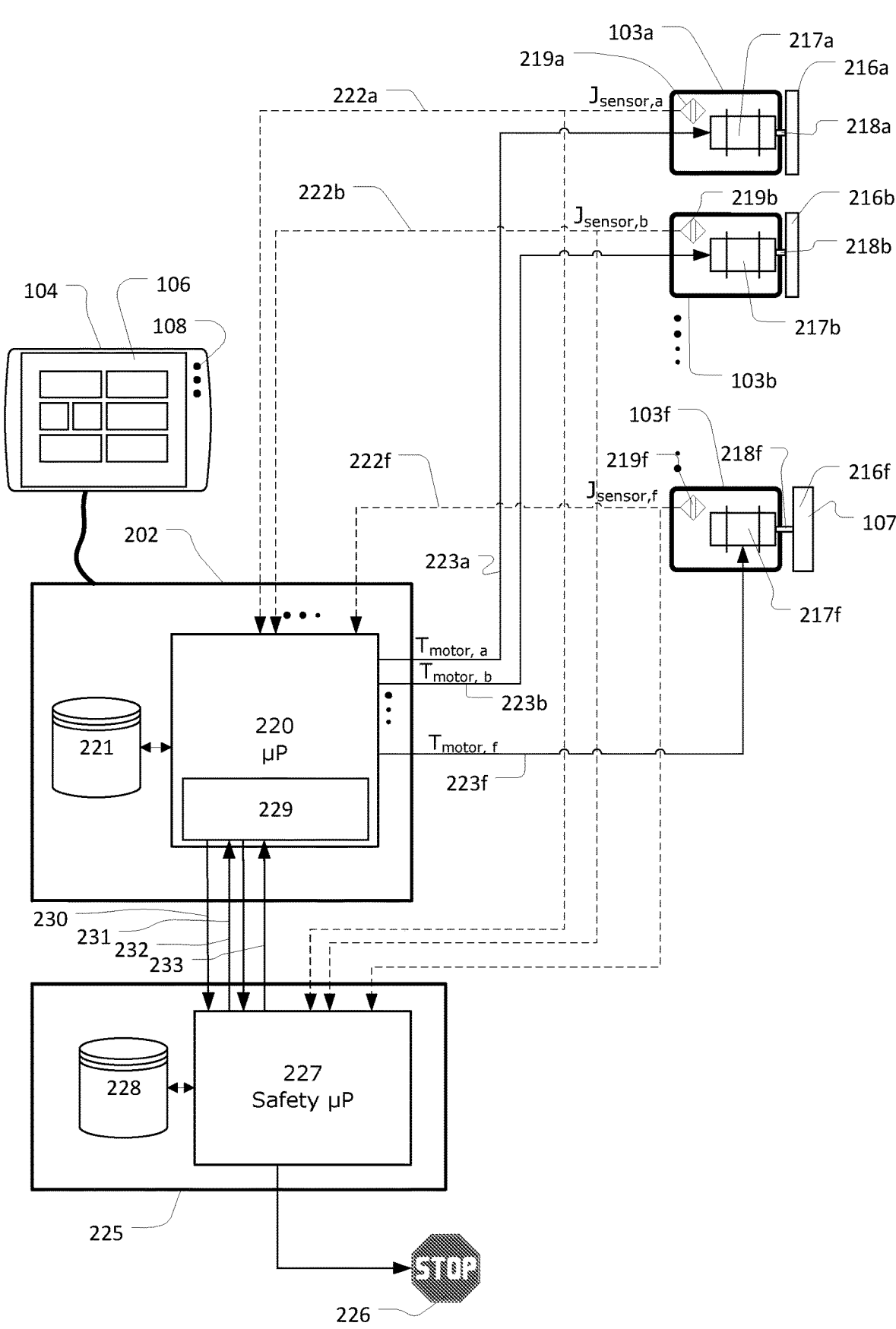
FIG. 2-3 illustrates simplified structural diagrams of a robot system according to the present invention robot arm.

FIG. 2 illustrates a simplified structural diagram of the robot arm illustrated in FIG. 1. The robot joints 103a, 103b and 103f have been illustrated in structural form and the robot joints 103c, 103d, 103e have been omitted for the sake of simplicity of the drawing. Further the robot joints are illustrated as separate elements however it is to be understood that they are interconnected as illustrated in FIG. 1. The robot joints comprise an output flange 216a,216b,216f and a joint motor 217a, 217b, 217f, where the output flange 216a,216b,216f is rotatable in relation to the robot joint and the joint motor 217a, 217b, 217f is configured to rotate the output flange via an output axle 218a, 218b, 218f. In this embodiment the output flange 216f of the tool joint 103f comprises the tool flange 107. At least one joint sensor 219a, 219b, 219f providing a sensor signal 222a, 222b, 222f indicative of at least one joint sensor parameter $J_{sensor,a}$, $J_{sensor,b}$, $J_{sensor,f}$ of the respective joint. The joint sensor parameter (also generic referred to as operation parameters) is at least indicative of at least one of a pose parameter indicating the position and orientation of the output flange in relation to the robot joints for instance: an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft flange in relation to the robot joint.

The robot controller 202 also referred to as robot process controller comprises a controller processer 220 and controller memory 221 and is configured to control the joint motors of the robot joints by providing motor control signals 223a, 223b, 223f to the joint motors. The motor control signals 223a, 223b, 223f are indicative of the motor torque $T_{motor,a}$, $T_{motor, b}$, and $T_{motor,f}$ that each joint motor shall provide to the output flanges, and the robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement. The dynamic model of the robot arm can be stored in the controller memory 221 and be adjusted based on the joint sensor parameters $J_{sensor,a}$, $J_{sensor,b}$, $J_{sensor,f}$ For instance, the joint motors can be provided as multiphase electromotors and the robot controller can be configured to adjust the motor torque provided by the joint motors by regulating the current through the phases of the multiphase motors as known in the art of motor regulation.

The robot system comprises a safety system 225 monitoring the robot arm and comprises a safety processer 227 also referred to as robot safety controller and safety memory 228. The safety system is configured to bring the robot arm into a safe state 226 based on at least one safety function evaluated by the safety system. The safe state is illustrated by a STOP sign indicating that one safe mode can be a mode where the robot arm is brought into a standstill, for instance by activating a brake system configured to brake the moving parts of the robot arm, by turning off power to the robot arm, etc. However, it is to be understood that the safe mode can be any mode of operation where the robot arm is considered safe in relation to a human, for instance the robot may be instructed to move at a reduced speed, to provide indication signal (visible, audial, haptic etc. or combinations thereof) warning a human that an error has occurred.

As mentioned, the robot arm can be brought in several different stop modes. The main purpose of the robot safety controller is to monitor the operation of the robot arm and bring the robot arm in a safe mode if a situation occurs where one or more safety limits are violated, and such situation is not handled by the robot process controller. If such situation occurs, and is not handled by the process controller, one of the safe modes the safety controller is able to bring the robot arm in is the so-called violation stop mode. The violation stop is comparable to the emergency stop in that the brakes in the joints are activated as well as the power to the robot joints are switched off. However, emergency stop can be triggered both externally by a button via an I/O and internally in the controller by sending a software command to the process controller. When the process controller stops the robot arm, the robot arm can be stopped by instructing the joint motors to hold the robot arm in a fixed position, by powering of the joint motors and/or engaging the mechanical brakes. However, the safety controller is still running in Normal mode and the user can quickly reinitiate the robot arm again and continue using the robot arm. This is opposite to a violation stop which is triggered internally by the safety controller when the safety controller detects a violation of the safety limits, e.g. if the speed of the TCP (TCP; Tool Center Point) is higher than the safety limit "TCP speed". Then the process controller stops the robot arm, the robot arm powers off, the mechanical brakes are engaged, and the safety controller is now in violation mode and the user has to reset the safety controller (done by the GUI) before the user can power on the robot arm again as described below.

It should be noted, that the safety system 225 may also communicate directly with the interface device 104. Such communication could include update of safety limits, status signals, etc.

Further it should be noted, that to increase safety the robot safety processor 227 of the safety system 225 may be implemented as two independent safety processors. At least a subset of tasks for such two independent safety controllers may be identical i.e. redundancy in the safety system is obtained. A more specific exemplary embodiment of the invention having two independent safety controllers is explained with reference to FIG. 3.

The robot controller 202 and the safety system 225 are provided on different hardware for instance in form of different computer mother boards, microcontrollers, processors, computer servers and/or integrated circuits.

Figure 3:
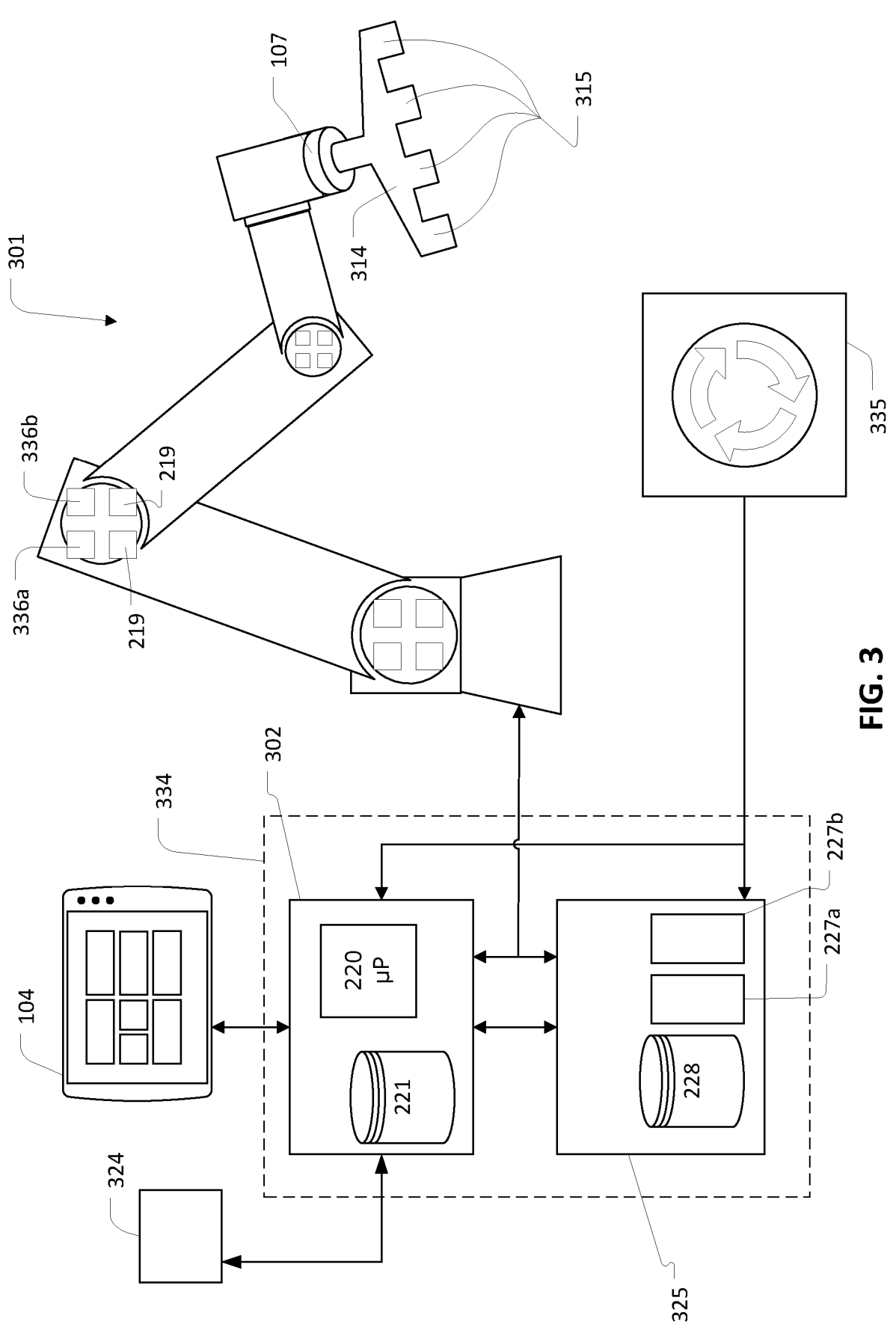

An exemplary embodiment of the invention will now be described with reference to FIG. 3. FIG. 3 illustrates the robot arm 301 as described above with reference to FIG. 1 and FIG. 2 and similar elements and features have been given the same reference numbers as in FIG. 1 and FIG. 2 and will not be describe further.

On FIG. 3, the robot arm 301 is equipped with a robot tool 314 attached to the robot tool flange 107. The robot tool 314 may comprise a variety of actuators and sensors 315 configured to perform a predetermined task. It should be noted, that in an exemplary embodiment, the robot tool 315 may be a standalone sensor i.e. not necessarily in physical interaction with an object.

As noted above, the basic operation of the robot arm 301 is controlled by means of basic control software. This means that a user can provide waypoints and move commands to the robot controller 302 (e.g. via the interface device 104) and then based on this input, the robot controller is able to, based on the basic control software, control the joints of the robot arm to move between the waypoints according to the provided instructions. Since the basic control software is developed to facilitate generic operation of the robot, it is not able e.g. to control a robot tool 315 connected to the robot tool flange 104. It can move such robot tool 315, but not operate it. Hence, if the robot tool 314 is a gripper, the gripping operation cannot be controlled by the basic control software. To be able to control such tool operation additional software is required and this additional software is in this document referred to as process control software.

The process control software can be any addition to the basic control software from waypoint coordinates to complicated software programs including software to optimize e.g. precision of operation of the robot arm 301 performed according to the basic control software. The process control software can be developed at an external data processing unit 324 and then uploaded to the robot control system 334 comprising both the robot controller 202 and the safety system 325 for being executed together with the basic control software. Typically, the process control software is an additional software layer provided which is making use of functions available in the basic control software or as mentioned operations parameters such as waypoint coordinates or limits for the operation of the robot arm 301.

As mentioned, the control software (basic or process) controls the operation of the robot arm and therefore also when operation parameters should be evaluated according to the normal values or the process values of the safety limits. A non-limiting example of when the which of the normal and process values are used is if additional safety is needed i.e. if the robot needs to move slower or with less motor torque in areas where e.g. a person is allowed to be when the robot arm is in run-time mode or of the robot arm needs to handle fragile objects. It is possible to establish a virtual wall beyond which the robot only is allowed to be operated according to reduced normal values. Alternative, beyond the virtual wall, the process values are used as values for the safety limits for, in this example, speed and torque.

In another non-limiting example, a first virtual wall could be established three meters from the robot arm and a second one meter from the root arm by means of sensors. When a person crosses the first virtual wall, the values of the safety limits are changed from normal to reduced normal values and when the person crosses the second virtual wall, the robot arm should stop. Hence, the process control software operates the robot arm according to normal values for the safety limits when the person is outside the first virtual wall. Between the first and the second virtual walls the robot arm is operated according to the most restrictive of the reduced normal value and a process value and when the user crosses the second virtual wall the process controller activates the emergency stop. As mentioned, the use of process values makes the operation of the robot arm flexible in that they can be adjusted run-time and safe in that the values are compared to the normal values/normal reduced values to ensure that the robot arm is controlled according to the most restrictive value. Accordingly, the safety of the robot installation is increased in that additional safety limits can be added to an existing safety approved and certified safety system and this without going through the complicated process of having the system approved upon each time safety limits are changed.

No matter which of the normal, reduced normal or process values that is used, the robot controller and/or the safety controller will ensure to bring the robot arm in a violation stop mode. Violation stop mode should be understood as a safety stop arrangement applied automatically if an evaluation results in violation of one of the safety limits i.e. if there the robot system automatically detects that something is not right. Typically, this it is the safety controller that brings the robot arm in violation mode if the process controller does not react on violation of a safety limit. In addition, sensors or switches that detects e.g. appearance of a person beyond the virtual wall or an emergency stop can also trigger bringing the robot arm into a stop mode. For example, if the emergency stop button 335 is pressed, the robot controller should stop the movement of the robot within a specified period of time which in an example is between 100 ms and 1000 ms, such as 200 ms, 300 ms, 400 ms or 500 ms. It should be noted that the stopping time is user-defined and hence dependent on the application of the robot arm and it could therefore be any value inside or outside this range however, preferably within 1000 ms. If the safety controller detects that the robot arm is still moving after this period of time has elapsed, the safety controller will bring the robot in violation stop mode where it will power off the robot arm causing the mechanical brakes to engage.

It should be mentioned that according to the present invention, the activation of emergency stop (as violation stop, the motors of the robot arm is powered off and the mechanical brake is engaged) and protective stop (robot arm stops moving but remains powered on) can be triggered by basic and/or process control software based on external input. Typically, these stop modes are referred to as binary limits which in the prior art is activated by changing an input on an I/O module by pushing a button or activating a sensor. With the present invention, these stop modes along with operation in reduced mode, can be triggered internally by the processors i.e. not only based on input from an I/O module. Further, the values for triggering these modes can be changed run-time.

As mentioned, only values of process values can be changed real-time. In an exemplary embodiment, a distance sensor is added to the robot arm configured to determines the distance from the robot tool to an object. The robot arm is allowed to move with maximum speed (normal values of safety limit) towards the object, but when getting close to the object (beyond a virtual wall), the speed must be reduced (reduced normal value of safety limit). For safety reasons, the user would like to reduce the speed beyond the virtual wall, but to be sure that the speed is reduce in time, the virtual wall is established a distance including a safety margin from the object. To allow as fast operation for as long time as possible, the user in the process control software specifies that the virtual wall is passed a certain distance from the object where the distance is measured by the distance sensor. Because the distance is measured, it is no longer necessary to add the safety margin and therefore the robot arm is allowed to operate at normal speed value closer to the object.

In this example, the user would like to be able to change the distance and thereby the location of the wall. Further, beyond the wall, the user would like to be able to adjust the speed of the robot arm. This is allowed run-time by the present invention in that the user has programmed in the process control software the possibility of using e.g. sliding bar where to change the process values. To be sure not to allow a value less restrictive than the normal or normal reduced value for the safety limit, the process value(s) are compared to the normal value(s) and if the user by mistake has selected a process value less restrictive, than the normal value for an operation parameter, the robot controller are using the normal value(s). Accordingly, a more flexible control and faster cycle time of the robot arm is obtained. This is advantageous in that it has the effect, that without in-depth knowledge of design limits of the robot arm, a user can safely specify and adjust a process value of a safety limit. No hazardous situations can occur in that if the process value defining a speed is e.g. higher than the normal value, the operation of the robot arm is made according to the normal value.

A group of predefined limits are in this document specified as safety limits. The value of these limits is referred to either as normal values or as process values and specified in the basic and/or process control software. Typically, the limits are defining maximum allowed speed, force, a direction, a distance, a position, a timer, etc. Hence, when operating the robot arm 301, the values of these safety limits are limiting the operation of the robot arm 301. If safety limits specified in the basic control software are violated, the robot control system 334 interrupts the operation of the robot arm 301 and ensures the robot arm 301 is brought in a so-called violation stop mode.

However, it can be beneficial that the robot arm 301 does not end up in violation stop mode, as this results in powering off, braking the robot and requires reset of the safety controller. It is the process controller, that is responsible for the operation of the robot and if this controller estimates that a safety limit is about to be violated it should bring the robot arm into a protective stop mode. If, for some reason, the robot controller processor 220 fails to observe such violation and the robot arm violates a safety limit, the robot safety system 225 takes over and ensures that the robot arm is brought in safe mode e.g. violation stop mode.

More specifically, in an exemplary embodiment, the robot controller will do its best to obey the safety limits. If it calculates that based on its current speed and trajectory, it is not possible to obey one of the safety limits, then it will proactively do a "Protective Stop", which basically just stops the robot from moving and displays a warning to the user via the interface 104, but the motors are still powered on and the brakes are not engaged. If it actually violates one of the safety limits (because the protective stop failed or e.g. an external force moved the robot faster than expected) then the robot safety controller will bring the robot arm into violation stop mode. When the robot safety controller brings the robot arm in violation stop mode, it informs the robot controller and the latter will calculate a trajectory to bring the robot at a full stop (within a time limit) and issue a power off command. If the robot controller fails to stop the robot within the limit, then the robot safety controller will engage the mechanical brakes regardless of whether the arm is still moving or not.

In an exemplary embodiment, the robot controller 220 receives input from sensors of the robot arm 301 and/or calculates based on measurements of e.g. current consumption operation parameters describing the real time operation of the robot arm 301. Based on the established operation parameters, the robot controller 202 evaluates if, for a given operation parameter, the value hereof, violates the value of the associated safety limit minus an offset. The safety limit is subtracted an offset to avoid conflict between which of the robot controller 220 and safety processor 227 that has to bring the robot arm in violation stop mode.

In an alternative exemplary embodiment, the robot controller brings the robot arm in protective stop mode if it is evaluated or estimated, that a safety limit minus an offset is or is about to be violated.

In an alternative exemplary embodiment, the joint controllers 336a, 336b performs redundant calculations, redundant measurements, etc. and in case there is not completely alignment between these redundant calculations/measurements, the joint controller(s) sends a signal indicating this to the robot controller and/or to the robot safety controller. Upon receiving this signal, the robot controller starts to bring the robot arm in a stop mode. It should be mentioned, that when using the term completely it is understood that a certain tolerance in measurements are accepted due to timing, measurement noise, sensor resolution, etc.

For the above examples it is true that, if the robot controller does not manage to stop the robot arm within the given period of time, the robot safety controller forces the robot arm in violation stop either based on communication directly from the robot safety controller or via the process controller. The violation stop is effectuated by releasing the mechanical brakes and powering off the robot arm.

The use of a safety controller as backup for the process controller is part of a certified safety system for the robot arm ensuring safe operation of the robot arm i.e. that the robot arm is brought in safe mode before a hazardous situation occurs or at least before a hazardous situation results in serious injuries of personal and goods around the robot arm. According to the certification of the safety system, it is not allowed to change any of the safety limits hereof nor any hardware configuration without powering off the Robot arm and restart the safety system. Therefore, typically a user is not allowed to change the safety limits runtime i.e. during operation of the robot arm. In the prior art, the user has to power off the robot arm to be able to change the non-binary values and also if this is done via upload of new process control software. It should be mentioned that the robot safety controller in one embodiment can be at least one safety level higher than the robot controller and further to increased safety, that the safety controller may be implemented as two independent controllers ensuring redundancy in the safety controller tasks.

Reference to safety level may refer to average probability of failure of the hardware i.e. controllers. Hence, a high level safety controller has a lower average probability of failure than a process controller. High level safety system which may include both hardware and software may be categorized according to SIL (SIL; Safety Integrity Levels) level 1-4 where 4 is highest.

Therefore, as explained, when uploading process control software to the robot controller, the safety limits associated therewith is used in combination with the basic control software to control the robot arm. A limit specifying e.g. elbow speed or force is provided in the basic control software, but for different reasons users of the robot arm may like to adjust these limits to make the robot arm move slower or allowing less torque. Therefore, instead of allowing a speed of 2 m/s of the robot tool defined by a safety limit of the basic control software, the allowed speed may be reduced to 1 m/s by a safety limit of the process control software.

In an exemplary embodiment, the basic control software is stored on the controller memory 221 from where it is executed by the robot controller and from where the safety controller also has access to at least the safety limits. It should be mentioned that the robot safety controller also has access to the nonbinary limits for being able to bring the robot arm in safe mode if the process controller fails to do so. Alternatively, or in addition, part of the basic control software and of the process control software is located on the safety memory 228. Often this part would include the safety limits.

In the situation where the process control software is controlling a robot tool, the actuators and sensors are electrically connected to I/O ports associated with the robot controller. When this is done and the process control software is uploaded to the robot controller, the robot controller based on the combination of basic control software and process control software is able to control the robot arm including an eventual robot tool. When uploaded, at least part of the operation values including the safety limits of the process control software are changeable without changing mode of the robot arm to a powered off mode.

It is ensured that when the robot arm is controlled according to safety limits of the process control software, these limits are not allowing operation of the robot arm to violate the non-changeable safety limits of the basic control software. This is done by an evaluation of an established valued of an operation parameter with the most restrictive of the value of a safety limit for that operation parameter that is provide by the basic control software and the process control software. In this way it is ensured that if the value of a safety limit specified by the process control software is e.g. too high, then the operation of the robot arm is made according to the value of the safety limit specified in the basic control software. In this way, it is always ensured that operation of the robot arm is complying with the safety requirements of the certified safety system even though the process control software is allowed to change value of the safety limits associated therewith.

Operation parameters such as joint speed and force, TCP speed and force, elbow speed and force, stopping distance and time, power, torque and tool direction is either measure directly or derived based on measurements. It is these values that are evaluated against the safety limits and if these are violated, the robot arm is brought in violation stop mode. The action needed in light of the evaluation result i.e. bringing the robot arm in protection stop mode or violation stop mode is made by either the robot process controller or the robot safety controller. The evaluation, however, can be made e.g. at local joint controllers such as joint controllers and the result is then sent to the process and safety controllers.

In an exemplary embodiment, the evaluation of a value of an operation parameter with the value of a corresponding safety limit is made differently in the process controller compared to the robot controller. This is to avoid conflict between which of the two controllers that should bring the robot arm in violation mode if necessary. To avoid this, the process controller is evaluating the established value of an operation parameter with a corresponding safety limit minus an offset. The offset should be large enough for the process controller to react, but still small enough to facilitate operation of the robot arm within a window of operation that is as large as possible. The offset depends on the type of safety limit and may be provided as a fixed value or as a percentage of the safety limit. For instance, in connection with joint angular speed the safety limit offset may be a fixed value of 12.5 rad/seconds where the safety limit may be to 192 rad/seconds This leaves an appropriate offset in the range of 1-15% of the value of the safety limit In an exemplary embodiment, if the process control software allows it, a user is able to change a process value of a safety limit, via the interface device 104. Such a change can be made either while the robot arm is in operation i.e. is moving or is in a stop mode depending on the specific process control software. Alternatively, the robot tool or sensors hereof can be used to change the value of a safety limit. A safety limit for minimum distance between the robot tool and an object can be updated with a value read from a tool sensor. This may require that the robot arm is in a teach mode, where such update of safety limit values is allowed.

Figure 4:
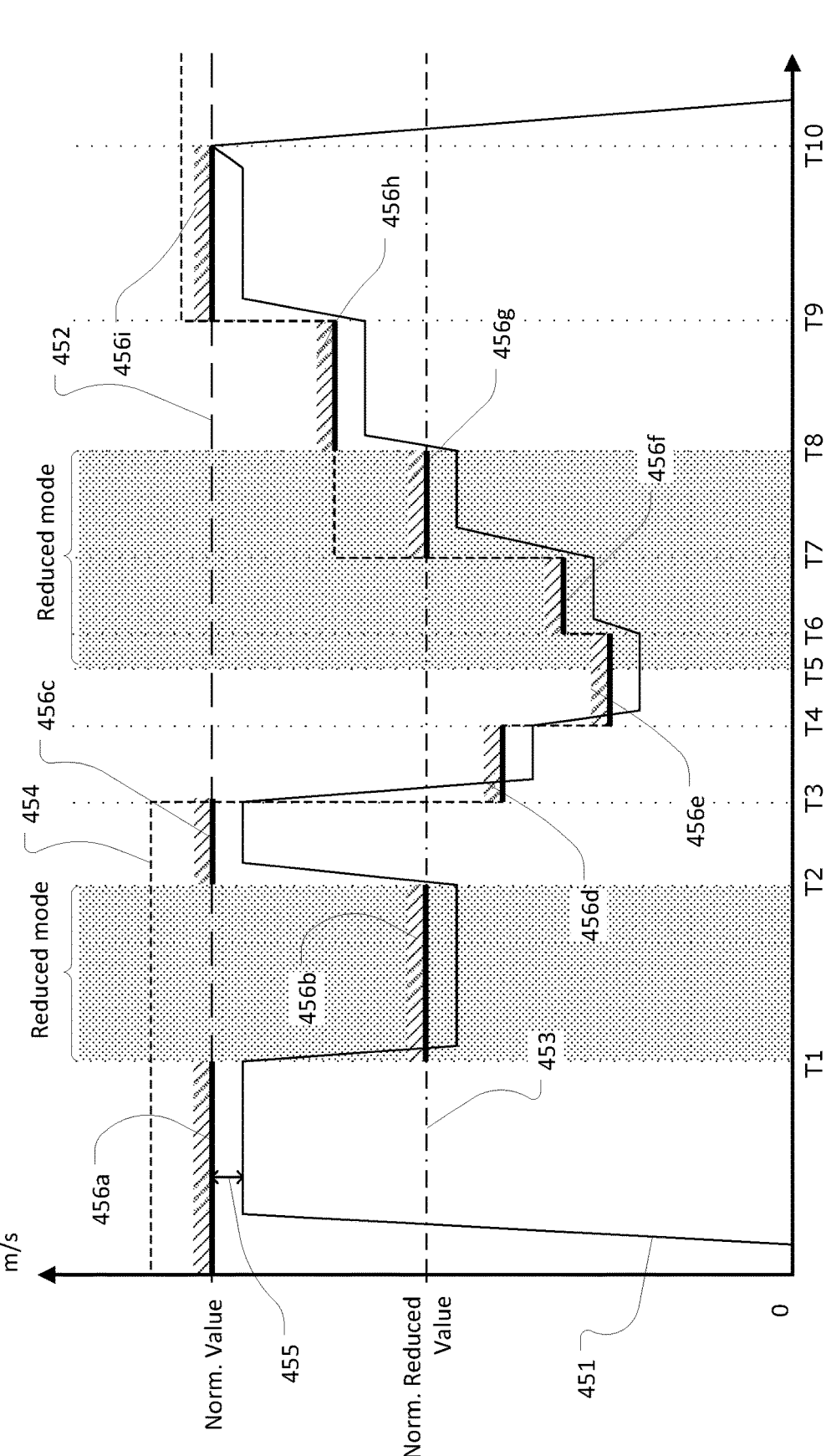
FIG. 4 illustrates a speed graph according to an exemplary embodiment of the invention.

FIG. 4 illustrates a curve 451 (solid line) of the operation of the robot arm. The curve represents a real-time established value of an operation parameter, the value of which is limited by safety limit values defined by a normal value 452 (long dashed line), a reduced normal value 453 (dashed-dashed-dotted line) and process value 454 (short dashed line). The operation parameter could be a force, distance, speed, etc. It is noted, that as described above in an exemplary embodiment, the value of the operation parameter is controlled by the robot controller to be an offset 455 below the specified values of the safety limit. Hence, as long as there is no violation of the different values for the safety limit, the operation of the robot arm continues. If a value minus an offset is violated, the process controller should bring the robot arm in a stop mode and if this is not happening, the safety controller should bring the robot arm in violation mode.

As illustrated, the robot arm is controlled according to the most restrictive of the normal and process values for the safety limits. The normal value 452 and the reduced normal value 453 does not change whereas the value of the process value 454 changes several times during the illustrated operation cycle part. Further, it is illustrated that the process controller controls the speed of the robot arm to be an offset below the active safety limit value 456a-456i as illustrated by a solid line with a hatched area above the line, which is also explained above. The robot arm starts in normal mode having a process value that is higher than the normal value and therefore initially in the sequence illustrated on FIG. 4 the process controller controls the robot arm according to an active safety limit value 456a defined by the normal value. The evaluation or comparison of process value to normal value and reduced normal value is made continuous during operation, is triggered by modification of the process value, change of state in the control software, change of mode of operation or the like.

In case the curve 451 may reflect the speed of the robot arm, and as noted the robot arm is operated at normal speed (as indicated by the active safety limit 456) until time T1.

At time T1, the reduced mode (illustrated as shaded area) is triggered either by input from the robot tool, an external sensor or by the control software. Therefore, the active safety limit 456b is change to the reduced normal value based on which the robot arm is controlled between time T1 and T2. The reduced normal value is also below (more restrictive) than the process value 454 and therefore, the robot arm is controlled according to an active safety limit 456b defined by the reduced normal value 453.

At time T2, robot arm switches back to normal mode, hence the value of the active safety limit 456c is again the normal value 452 in that this is still more restrictive compared to the process value 454.

At time T3, the robot arm is still in normal mode and the process value is modified. An evaluation of the new value of the process value 454 to the normal value 452 results in that the new active safety limit 456d is more restrictive and therefore this is used to limit the speed between time T3 and T4.

At time T4, the process value is update again to a new value. The result of the evaluation of normal value 452 and the new process value 454 is still the same and the robot arm therefore continues to be controlled according to the process value 454 and the active safety value 456e is updated to the new process value.

At time T5, the mode of operation of the robot arm is changed to reduced mode (illustrated as shaded area) i.e. a new evaluation of values for the safety limit is made, this time between the reduced normal value 453 and the process value 454. The result of the evaluation is that the process value 454 is the most restrictive and therefore, the process controller continues to control according to the active safety value 456e.

At time T6, the process value is modified again to a new value 454, the mode of operation is still reduced mode and the reduced normal value 453 remains unchanged. The result of the evaluation of safety limit values is still, that the process value 454 is the most restrictive and therefore, the active safety value 456f is updated to the new process value.

At time T7, the process value is modified again to a new value, the mode of operation is still reduced mode and the reduced normal value 453 remains unchanged. The result of the evaluation is now changing in that the new process value is higher than the reduced normal value. Accordingly, the active safety value 456g is updated to the reduced normal mode value.

At time T8, the mode of operation is changed back to normal mode and hence the evaluation now compares the normal value to the process value. The result hereof is that the process value is the most restrictive and hence is active safety limit 546h is updated to process value.

At time T9, the process value is modified again to a new value while the mode of operation remains normal mode. The result of the evaluation now shows that the normal value is more restrictive than the new process value and therefore, the active safety limit 546i is updated to the normal value.

At time T10, a violation of the normal value 452 of the active safety limit 456i is observed. More particularly a violation, that is not observed or reacted to in time by the process controller and therefore handled by the safety controller. This is illustrated in that the value for the operation parameter illustrated by curve 451 increases above the normal value minus the offset. When reaching the normal value, the safety controller change mode to violation stop stops operation of the robot arm as described above. In this exemplary embodiment, the safety controller will instantly engage mechanical brakes and power off the robot. Most of times, it would be the process controller which is bringing the robot arm in protection stop before, the safety controller brings the robot arm in violation stop mode.

The evaluation of values for the safety limits is at least a comparison between two values either the normal value versus the process value or the reduced normal value versus the process value. As mentioned, it is possible to have several process values for one or more safety limits, so the evaluation may include comparing several pairs of normal/reduce normal values versus process values.

As can be seen from FIG. 4 only the process values can be modified run-time. A modification of the normal and reduced normal values can not be made run-time, it requires stop of operation. As explained, the present invention solves this problem by allowing the user to introduce and then modify the process values making sure that the robot arm is only controlled according the these if these are more restrictive that the normal value and the reduced normal value respectively.

It should be mentioned, that during one operation cycle of the robot arm, a plurality of different process control software each having their own process values for the safety limits may run simultaneously and/or following each other. To illustrate this, table 1 below illustrates a several safety limits having different values for the basic control software and different process control software.

TABLE 1

| examples of safety limit values | | | | |
| --- | --- | --- | --- | --- |
| Safety limit | Normal | Normal reduced | Process value #1 | Process value #n |
| TCP speed [mm/s] | 1500 | 750 | 1000 | 1600 |
| TCP force [N] | 150 | 120 | 150 | 160 |
| Elbow speed [mm/s] | 1500 | 750 | 800 | 500 |

TABLE 1-continued

| | | examples of safety limit values | | |
|---|---|---|---|---|
| Safety limit | Normal | Normal reduced | Process value #1 | Process value #n |
| Elbow force [N] | 150 | 120 | 500 | 200 |
| Joint speed [deg/s] | 191 | 60 | 150 | 191 |
| Joint position [deg] | [−363, 363] | [−180, 250] | [−363, 363] | [−500, 1000] |
| Stop distance [mm] | 500 | 300 | 100 | 100 |
| Stop time [ms] | 400 | 300 | 10 | 1000 |
| Power limit [W] | 300 | 200 | 300 | 300 |
| Momentum [Kg m/s] | 25 | 10 | 150 | 5 |
| Tool direction deviation [deg] | 181 | 50 | 150 | 80 |

Figure 5:
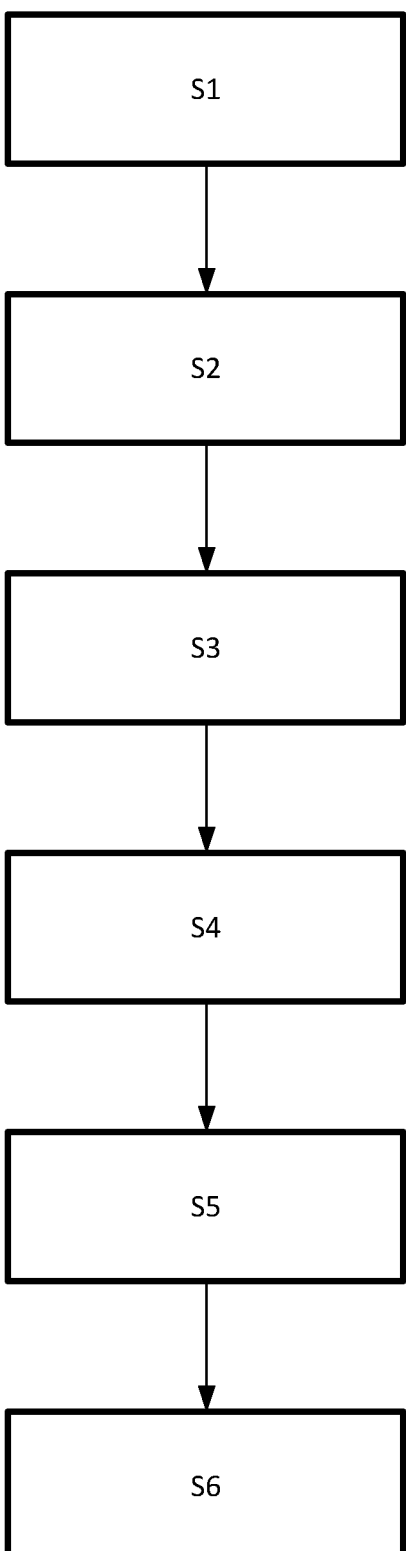
FIG. 5 illustrates a flowchart of a method of monitoring a robot system according to an exemplary embodiment of the invention.

FIG. 5 illustrates a flow chart of the method of monitoring a robot system as described above according to an exemplary embodiment of the invention. The method comprises the initial step S1 of establishing a robot arm controllable according to basic control software. Based on e.g. move commands of the basic control software, the robot controller is able to move the robot arm in a cartesian coordinate system. The move sequence is determined by a programmer or user of the robot arm and is typically a repetitive sequence.

At least some robot tools require dedicated control software to be controlled by the robot controller. This tool specific control software is referred to as process control software and is established in step 2 S2. The process control software may receive input from sensors attached to the robot and provide output to actuators, valves, or the like depending on the type of robot tool. Hence, based on a combination of basic and process control software, the robot controller is able to control the robot arm including the robot tool to perform a specific operation.

The process control software could be developed directly by use of the robot controller 202 and hence stored on the controller memory 221. Alternatively, at least part of the process control software is developed external to the robot controller and then uploaded to the controller memory 221, from where it is accessible for the robot controller and maybe also for the safety processor 227. Typically, if the process control software is mainly developed independent from the robot controller, then upon uploaded to the memory and installation of robot arm, the robot arm needs to be integrated in the environment where it is to operate. No matter how the process control software is developed, it is stored on the controller memory 221 in step 3 S3.

As mentioned above, the robot arm is born with the basic control software including predefined safety limits, limiting the operation of e.g. speed, force, stop distance, tool direction, etc. (more examples are provided in table 1). For each of the safety limits, there is specified a default value referred to as normal value which is limiting the operation of the robot arm. Depending on the robot tool and operation task the robot arm needs to carry out, these limits may need to be different from the normal values and to accommodate this, the process control software introduces process values for one or more of the safety limits. The value of these process values may be adjusted runtime while the robot arm is in operation mode whereas the normal values only are allowed to be changed when the robot arm is powered off.

The reason for only being able to change the normal values during power off is that these values are part of the certified safety system of the robot ensuring safe operation of the robot arm both with respect to the objects handled by the robot arm and its surroundings including persons. Therefore, each time a normal value is changed, the robot controller needs to approve the new value to ensure that no design limits etc. are violated. If not, the new value is accepted, and the robot arm is then controlled according to the new value of the safety limit.

In step 4 S4, the robot arm is as indicated integrated and prepared to operate in its local environment and after the integration, it is able to be controlled according to a combination of the basic and process control software including normal and process value of several safety limits to perform a dedicated operation task.

In step 5 S5, during operation of the robot arm, the robot controller establishes real-time values of operation parameters. The operation parameters can be provided directly from sensors of the robot arm or derived from sensor input.

As mentioned, the process values can be adjusted real-time during operation of the robot arm. This is advantageous in that e.g. integration of the robot arm can be made faster in that changes to values of safety limits can be adjusted real-time while the robot arm is in operation mode.

However, since the safety limits are part of the safety system, there are boundaries for the values therefore and to avoid compromising safety by adjusting process values out of allowed range, changes hereof are compared to the normal value and the safest i.e. typically the most restrictive of the process and normal values are chosen as limit for the operation of the robot arm. This comparison or evaluation is performed real-time by the robot controller in step 6 S6 where also the safety controller is monitoring the operation of the robot arm. If an operation value violates a safety limit, the robot controller brings the robot arm in a stop mode within a predetermined time.

It should be mentioned, that also or alternatively the robot joint controllers may perform evaluation including calculations or comparisons and if e.g. two joint controllers do not agree on a sensor input, calculation or comparison, a signal reflecting this is provided to the robot and safety controllers. Upon receiving such signal, the robot controller should bring the robot arm in a stop mode which is again monitored by the safety controller.

The monitoring performed by the safety controller may include establishing e.g. calculate, receive, etc. the operation parameter and comparing it to the value of the associated safety limit. Further, the safety controller may monitor if the robot controller brings the robot arm in a stop mode within the predetermined stopping time. If this is not the case, the safety controller brings the robot arm in violation stop mode.

| BRIEF DESCRIPTION OF FIGUR REFERENCES | |
|---|---|
| 101, 301 | Robot arm |
| 202, 302 | Robot controller |
| 103a–103f | Robot joint |
| 104 | Interface device |
| 105 | Robot base |
| 106 | Display |
| 107 | Robot tool flange |
| 108 | Input devices |
| 109 | Robot control box |
| 111a–111f | Axis of robot joints |

-continued

BRIEF DESCRIPTION OF FIGUR REFERENCES

| | |
|---|---|
| 112 | Direction of gravity |
| 113a-113f | Rotation arrow of robot joints |
| 314 | Robot tool |
| 315 | Tool actuators and sensors |
| 216a; 216b; 216f | Output flange |
| 217a; 217b; 2179f | Joint motors |
| 218a; 218B, 218f | Output axle |
| 219a; 219b; 219f | Joint sensor |
| 220 | Controller processor |
| 221 | Controller memory |
| 222a; 222b; 222f | Joint sensor signal |
| 223a, 223b, 223f | Motor control signals |
| 324 | External data processing unit |
| 225, 325 | Safety system |
| 226 | Safe mode |
| 227 | Safety processor |
| 228 | Safety memory |
| 229 | Additional safety software code |
| 334 | Robot control system |
| 335 | Emergency stop button |
| 336a, 336b | Joint controller |
| 451 | Curve of operation parameter |
| 452 | Safety limit normal value |
| 453 | Safety limit reduced normal value |
| 454 | Process value |
| 455 | Offset |
| 456a-456i | Active safety limit value |
| S1 | Establishing robot arm with basic software |
| S2 | Establishing process control software |
| S3 | Store process control software in memory |
| S4 | Monitoring robot controller |
| S5 | Confirming receipts of additional safety parameter |
| S6 | Test of additional safety parameter |

The invention claimed is:

1. A robot system comprising:

a robotic arm connecting a base and a tool flange;

a process controller comprising a processing device configured to control operation of the robotic arm using basic control software and process control software; and a safety controller comprising a processing device configured to monitor and to control operation of the robotic arm;

wherein the basic control software is associated with safety limits, the safety limits having normal values, the normal values of the safety limits for limiting operation of the robotic arm when the robotic arm is controlled by the process controller using the basic control software;

wherein the process control software is associated with at least one safety limit among the safety limits, the at least one safety limit having a process value for limiting operation of the robotic arm when the robotic arm is controlled by the process controller using the process control software, the process value being different from a normal value for the at least one safety limit;

wherein the process controller is configured to determine whether to change a mode of operation of the robotic arm when an evaluation of one or more values of one or more operational parameters of the robotic arm estimates a violation of a more restrictive one of the process value or the normal value for the at least one safety limit; and wherein the safety controller is configured to cause the robotic arm to stop operation of the robotic arm when the process controller fails to observe the violation and when the evaluation of the one or more values of the one or more operational parameters results in determining the violation.

2. The robot system of claim 1, wherein the safety controller is configured to compare the normal value to the process value to determine the more restrictive one of the process value or the normal value.

3. The robot system of claim 1, wherein, when the process controller changes the mode of operation of the robotic arm by stopping operation of the robotic arm, the process controller is configured to leave the robotic arm powered on; and wherein, when the safety controller stops operation of the robotic arm, the safety controller is configured to power-off the robotic arm.

4. The robot system of claim 1, wherein the process value comprises a first value minus a first offset and the normal value comprises a second value minus a second offset.

5. The robot system of claim 4, wherein the evaluation comprises determining the process value by subtracting the first offset from the first value and determining the normal value by subtracting the second offset from the second value.

6. The robot system of claim 1, wherein the process controller is configured to compare the normal value and the process value to determine the more restrictive one of the process value or the normal value.

7. The robot system of claim 1, wherein when the process controller changes the mode of operation of the robotic arm, the process controller is configured to put the robotic arm in a reduced operation mode that is based on a reduced normal value among the normal values.

8. The robot system of claim 1, wherein the at least one safety limit is associated with the process value when the process control software is uploaded to a memory from which the process controller can execute the basic control software and the process control software.

9. The robot system of claim 1, further comprising: memory to store values for the safety limits.

10. The robot system of claim 1, wherein the safety limits comprise one or more of the following: tool center point speed, tool center point force, elbow speed, elbow force, joint speed, joint position, stopping distance, stopping time, power limit, torque limit, or tool direction.

11. The robot system of claim 1 wherein at least one of the following controllers is configured to perform the evaluation of the one or more operational parameters: the process controller, the safety controller, or a robot joint controller.

12. The robot system of claim 1, wherein the evaluation of the one or more values of the one or more operational parameter comprises obtaining the one or more values for the one or more operational parameters, respectively, and comparing the one or more values to at least one of the process value or the normal value for the at least one safety limit.

13. The robot system of claim 1, wherein a safety rating of the safety controller is higher than a safety rating of the process controller.

14. The robot system of claim 1, wherein the safety controller is configured to provide a confirmation to the process controller, where the confirmation indicates that the safety controller has received the process value for the at least one safety limit.

15. The robot system of claim 1, wherein the safety controller is one of at least two independent safety controllers implemented using different hardware in the robot system, where each independent safety controller is configured to cause the robotic arm to stop operation of the robotic arm when the process controller fails to observe the violation and when evaluation of the one or more values of the one or more operational parameters results in determining the violation.

16. The robot system of claim 1, further comprising:

a user interface for enabling a user to communicate with the robot system, wherein the user interface comprises means for changing the process value while the robotic arm is in operation.

17. The robot system of claim 1, where the one or more values of the one or more operational parameters are based on sensor input.

18. A method of monitoring a robot system, where the robot system comprises:

(i) a robotic arm comprising joints connecting a base and a tool flange;

(ii) a process controller comprising a processing device configured to operate the robotic arm using at least one of basic control software and process control software, wherein:

(a) the basic control software is associated with safety limits, the safety limits having normal values, the normal values of the safety limits for limiting operation of the robotic arm when the robotic arm is controlled by the process controller using the basic control software, and (b) the process control software is associated with at least one safety limit among the safety limits, the at least one safety limit having a process value for limiting operation of the robotic arm when the robotic arm is controlled by the process controller using the process control software, the process value being different from a normal value for the at least one safety limit; and (iii) a safety controller comprising a processing device configured to monitor and to control operation of the robotic arm, wherein the process controller and the safety controller are different hardware; and wherein the method comprises:

during operation of the robotic robot arm, obtaining one or more values of one or more operational parameters of the robotic arm;

using the process controller, determining whether to change a mode of operation of the robotic arm when an evaluation of the one or more operational parameters estimates a violation of a more restrictive one of the process value or the normal value for the at least one safety limit; and using the safety controller, causing the robotic arm to stop operation of the robotic arm when the process controller fails to observe the violation and when the evaluation of the one or more operational parameters results in determining the violation.

19. The method of claim 18, further comprising:

comparing the normal value and the process value to determine the more restrictive one.

20. The method of claim 18, the wherein at least part of the evaluation is performed on at least one of the process controller or the safety controller.

21. The method of claim 20, wherein the evaluation comprises comparing the one or more operational parameters with the more restrictive one of the process value or the normal value.

22. The method of claim 18, further comprising:

obtaining the one or more values of the one or more operational parameters using one or more joint controllers.

23. The method of claim 18, further comprising:

obtaining the one or more values of the one or more operational parameters based on sensor input.

24. The method of claim 18, wherein at least part of the evaluation is performed using one or more joint controllers.

25. The method of claim 18, further comprising: receiving a signal at at least one of the process controller or the safety controller, the signal comprising a result of the evaluation, and based on the signal, at least one of the process controller or the safety controller determines if a change of the mode of operation of the robotic arm is necessary.

26. The method of claim 18, further comprising:

adjusting the process value for at least one safety limit while the robotic arm is operational.

27. The method of claim 18, wherein the process control software is obtained from an external data processing unit.

28. The method of claim 18, wherein, when the process controller changes the mode of operation of the robotic arm by stopping operation of the robotic arm, the process controller leaves the robotic arm powered on; and wherein, when the safety controller stops operation of the robotic arm, the safety controller powers-off the robotic arm.

29. The method of claim 18, wherein the process value comprises a first value minus a first offset and the normal value comprises a second value minus a second offset.

30. The method of claim 29, wherein the evaluation comprises determining the process value by subtracting the first offset from the first value and determining the normal value by subtracting the second offset from the second value.

31. A robot system comprising:

a robotic arm connecting a base and a tool flange;

a process controller comprising a processing device configured to control operation of the robotic arm using basic control software and process control software; and a safety controller comprising a processing device configured to monitor and to evaluate operation of the robotic arm;

wherein the basic control software is associated with safety limits, the safety limits having normal values, the safety limits for limiting operation of the robotic arm when the robotic arm is controlled by the process controller using the basic control software;

wherein the process control software is associated with at least one safety limit among the safety limits, the at least one safety limit having a process value that is different from a normal value for the at least one safety limit;

wherein the process value is changeable while the robot system is in run-time mode;

wherein the process controller is configured to cause the robotic arm to enter a violation stop mode when an evaluation of the one or more operational parameters results in determining a violation of a more restrictive one of the process value minus an offset or the normal value minus an offset for the at least one safety limit; and wherein the safety controller is configured to cause the robotic arm to enter the violation stop mode when an evaluation of the one or more operational parameters results in determining a violation of a more restrictive one of the process value or the normal value for the at least one safety limit.

32. A robot system comprising:

a robotic arm connecting a base and a tool flange;

a process controller comprising a processing device configured to control operation of the robotic arm using basic control software and process control software; and a safety controller comprising a processing device configured to monitor and to evaluate operation of the robotic arm;

wherein the basic control software is associated with safety limits, the safety limits having normal values, the safety limits for limiting operation of the robotic arm when the robotic arm is controlled by the process controller using the basic control software;

wherein the process control software is associated with at least one safety limit among the safety limits, the at least one safety limit having a process value that is different from a normal value for the at least one safety limit;

wherein the process value is changeable while the robot system is in run-time mode;

wherein the safety controller is configured to cause the robotic arm to enter a violation stop mode when an evaluation of the one or more operational parameters determines a violation of a more restrictive one of the process value or the normal value for the at least one safety limit; and wherein the evaluation comprises subtracting an offset from the process value and subtracting an offset from the normal value before determining the violation of the more restrictive one of the process value or the normal value.

33. A robot system comprising:

a robotic arm connecting a base and a tool flange;

a process controller comprising a processing device configured to control operation of the robotic arm using basic control software and process control software; and a safety controller comprising a processing device configured to monitor and to control operation of the robotic arm;

wherein the basic control software is associated with safety limits, the safety limits having normal values, the normal values of the safety limits for limiting operation of the robotic arm when the robotic arm is controlled by the process controller using the basic control software;

wherein the process control software is associated with at least one safety limit among the safety limits, the at least one safety limit having a process value for limiting operation of the robotic arm when the robotic arm is controlled by the process controller using the process control software, the process value being different from a normal value for the at least one safety limit;

wherein the process controller is configured to determine whether to change to a mode of operation of the robotic arm that does not include power off when an evaluation of one or more values of one or more operational parameters of the robotic arm estimates a violation of a more restrictive one of the process value or the normal value for the at least one safety limit; and wherein the safety controller is configured to cause the robotic arm to stop operation of the robotic arm when the evaluation of the one or more values of the one or more operational parameters results in determining the violation.

34. A robot system comprising:

a robotic arm connecting a base and a tool flange;

a process controller comprising a processing device configured to control operation of the robotic arm using basic control software and process control software; and a safety controller comprising a processing device configured to monitor and to control operation of the robotic arm;

wherein the basic control software is associated with safety limits, the safety limits having normal values, the normal values of the safety limits for limiting operation of the robotic arm when the robotic arm is controlled by the process controller using the basic control software;

wherein the process control software is associated with at least one safety limit among the safety limits, the at least one safety limit having a process value for limiting operation of the robotic arm when the robotic arm is controlled by the process controller using the process control software, the process value being different from a normal value for the at least one safety limit;

wherein the process controller is configured to determine whether to change operation of the robotic arm to a protective stop mode when an evaluation of one or more values of one or more operational parameters of the robotic arm estimates a violation of a more restrictive one of the process value or the normal value for the at least one safety limit; and wherein the safety controller is configured to cause the robotic arm to stop operation of the robotic arm when the evaluation of the one or more values of the one or more operational parameters results in determining the violation.

* * * * *